United States Patent
Costabel et al.

(10) Patent No.: US 10,473,139 B2
(45) Date of Patent: Nov. 12, 2019

(54) 2-COMPONENT CLIP

(71) Applicant: SFS intec Holding AG, Heerbrugg (CH)

(72) Inventors: Sascha Costabel, Herrenberg (DE); Markus Rottler, Ebhausen (DE); Markus Lichtensteiger, Montlingen (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 15/714,263

(22) Filed: Sep. 25, 2017

(65) Prior Publication Data
US 2018/0094671 A1     Apr. 5, 2018

(30) Foreign Application Priority Data
Sep. 30, 2016   (DE) .................. 10 2016 118 657

(51) Int. Cl.
*F16B 37/04*     (2006.01)
*F16B 2/22*      (2006.01)

(52) U.S. Cl.
CPC .............. *F16B 37/043* (2013.01); *F16B 2/22* (2013.01); *F16B 37/04* (2013.01); *F16B 37/044* (2013.01)

(58) Field of Classification Search
CPC .... F16B 37/044; F16B 37/043; F16B 37/041; F16B 39/24; Y10T 29/49947; Y10S 411/97
See application file for complete search history.

(56) References Cited

U.S. PATENT DOCUMENTS

| | | | |
|---|---|---|---|
| 3,646,982 A | | 3/1972 | Cushman |
| 4,219,064 A | * | 8/1980 | Lozano ................. F16B 37/041 411/103 |
| 6,474,917 B2 | | 11/2002 | Gauron |
| 8,177,466 B2 | * | 5/2012 | Csik ..................... F16B 37/043 411/174 |
| 2002/0119026 A1 | | 8/2002 | Gauron |
| 2008/0310931 A1 | | 12/2008 | Csik et al. |
| 2015/0152908 A1 | | 6/2015 | Schwarzbich |
| 2017/0138388 A1 | | 5/2017 | Figge et al. |

FOREIGN PATENT DOCUMENTS

| | | |
|---|---|---|
| DE | 19831001 | 2/2000 |
| DE | 102015104963 | 10/2015 |
| WO | 2016102989 | 6/2016 |

* cited by examiner

*Primary Examiner* — Jack W Lavinder
(74) *Attorney, Agent, or Firm* — Volpe and Koenig, P.C.

(57) ABSTRACT

A lightweight construction fastener or clip having a clip body and a fastening element 32. The clip body includes a first leg and a second leg, which are connected with each other by a web 45 at one end. The clip body is formed of one piece, but includes at least two volume sections 61, 62, wherein the first section 61 is formed of a first plastic and the second volume section 62 is formed of a second plastic. The properties of the first and second plastics are different from each other with respect to one or more criteria. A method for producing such a clip body includes manufacturing it in one piece in a multi-component injection molding process from at least two plastics. Further the invention includes a method for manufacturing the lightweight construction fastener or clip by placing a fastening element 32 into the injection molding tool; encapsulating the fastening element 32 and overmolding the fastening element 32 in a multi-component injection molding process.

10 Claims, 3 Drawing Sheets

2-COMPONENT CLIP

INCORPORATION BY REFERENCE

The following documents are incorporated herein by reference as if fully set forth: German Patent Application No. 10 2016 118 657.0, filed Sep. 30, 2016.

FIELD OF THE INVENTION

The present invention is concerned with lightweight construction fasteners or clips, for which various terms exist in the industry and which in English are called clip nuts. In particular the present invention refers to a method for producing such clip nuts in a 2-component injection moulding process.

BACKGROUND

In vehicle construction, for example in the aircraft industry, fastening elements are used e.g. for claddings which have to meet special requirements. In order to avoid machining steps during final assembly, panel-shaped elements are e.g. provided with preliminary bores and, prior to final assembly, are provided with clips or inserts, which comprise further screwing elements attached with a certain amount of play. These screwing elements or snap-on holders are then, during final assembly, engaged by connectors or fasteners to other cladding elements/structural bearing elements. The panel-shaped elements or components are, in this case, often lightweight wall elements or sandwich panels, which for weight reasons are formed of two outer layers (from plastic or aluminium) in most cases, which are glued to a honeycomb-shaped stiffening arranged in between.

A clip 10 of this kind is shown in FIG. 1. This is basically shaped as a clamp with a first leg 11 and a second leg 12 with connecting web 13. To assemble it the clip is pushed onto a plate (18, only hinted at), so that a fastening element 20 comes to lie on a prepared opening in the plate (hidden in FIG. 1). This fastening element 20 (not visible in FIG. 1) essentially consists of a plate-shaped base with two nibs (projections 14, 15) and a nut part 21. The two projections 14, 15 are each held in a frame/by a bracket 16, 17 spanning the nibs, of the side cheeks 19, 22 of the upper leg 11 of the clip. The frames are designed in such a way that the fastening element 20 has lateral play, but cannot drop out of the clip.

The type of fastening which the fastening element 20 allows, may be realised in many variants, for example as a releasable or non-releasable locking connection with one or more locking stages. Furthermore the cylindrical section 21 may comprise a female thread for a screw. In this case a screw connection has the advantage that it is releasable and that the tightening torque can be controlled. The fastening element 20 can, depending on the profile used, be manufactured from metal or plastic.

If using a lightweight construction fastener, a fastener is passed (from below in FIG. 1), during its assembly, through a recess in the leg 12, a covered opening in the plate 18 and a further opening in the upper leg 11 and connected there to the fastening element 20. The plate 18 is thus fastened to another element. This type of clip fastener is available in many variants with legs of different lengths, in different shapes and for different plate thicknesses.

U.S. Pat. No. 4,219,064 shows the basic principle of such a fastener from metal, the more recent U.S. Pat. No. 6,474,917 shows an embodiment with a plastic clip and a fastening element from metal. In U.S. Pat. No. 4,219,064 the fastener is produced from a plate-shaped metal sheet part which is bent and punched according to constructional requirements. In a second production step the fastening element is inserted manually or in an automated manner into the clip body as such. The more recent U.S. Pat. No. 6,474,917 follows the same lines as regards basic layout and final assembly of the clip, but uses a special plastic for the clip body.

U.S. Pat. No. 6,474,917 describes this plastic as both strong and flexible, which meets the requirement profile for this plastic in this area. However, the structural-mechanical requirements for the clip are not the same in all cases. In those areas where the fastening element is to be inserted during final assembly, a certain elasticity is required, as is the case in those areas, which are subject to bending stress when the clip is pushed onto the plate 18. Other areas, by contrast, shall be very firm in order to stand up to robust handling of the clip during assembly. Moreover the clip must be able during assembly to absorb the torque of the pushed-in fastener, which is transferred from the fastening element 20 to the frames/brackets 16, 17, which is why these frames/brackets have to be designed in an appropriate manner.

In U.S. Pat. No. 6,474,917, in order to improve flexibility in the area of the web 13, it is proposed to weaken the wall thickness of the material, which supports the function of the web as a joint. This means however that the firmness at this point is, of course, reduced to the same extent.

SUMMARY

It is the objective of the present invention to reduce the above-mentioned disadvantages of the state of the art and, in particular, to produce a clip with improved properties as regards elasticity and firmness. Furthermore a manufacturing process is described which allows faster, safer and automatic production of the clip.

In general terms a clip or lightweight construction fastener with one or more features of the invention is used to achieve this objective. This includes a one-piece clip body of plastic, with essentially a first leg and a second leg, which are arranged opposite each other and connected to each other by a web at one end. A fastening element is provided with a flat base plate with two projections or nibs and a holding part connected with the base plate. The second leg, on its outer side, comprises two frames with openings, which can receive the fastening elements and which are spaced apart from each other such that the fastening element can be held captive in the clip body with play. The clip body comprises at least two volume sections, wherein the first section is formed of a first plastic and the second volume section is formed of a second plastic. The properties of the first and the second plastic are different from each other.

DETAILED DESCRIPTION

Figure 1:
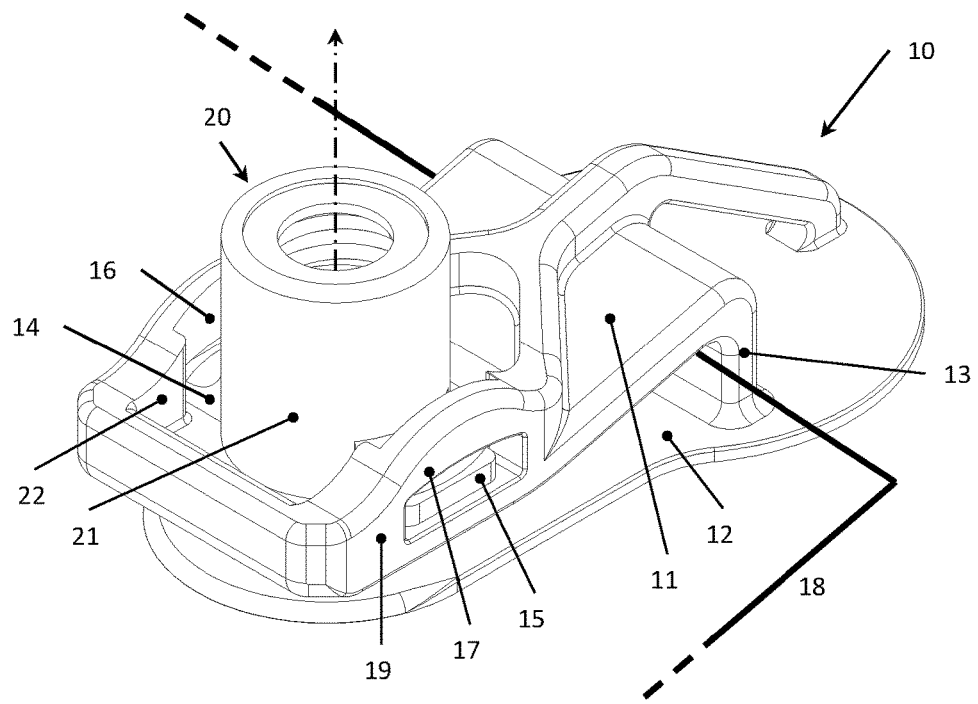
FIG. 1 is a perspective view of a lightweight construction fastener according to the state of the art. The characteristics have been explained above.
Figure 2:
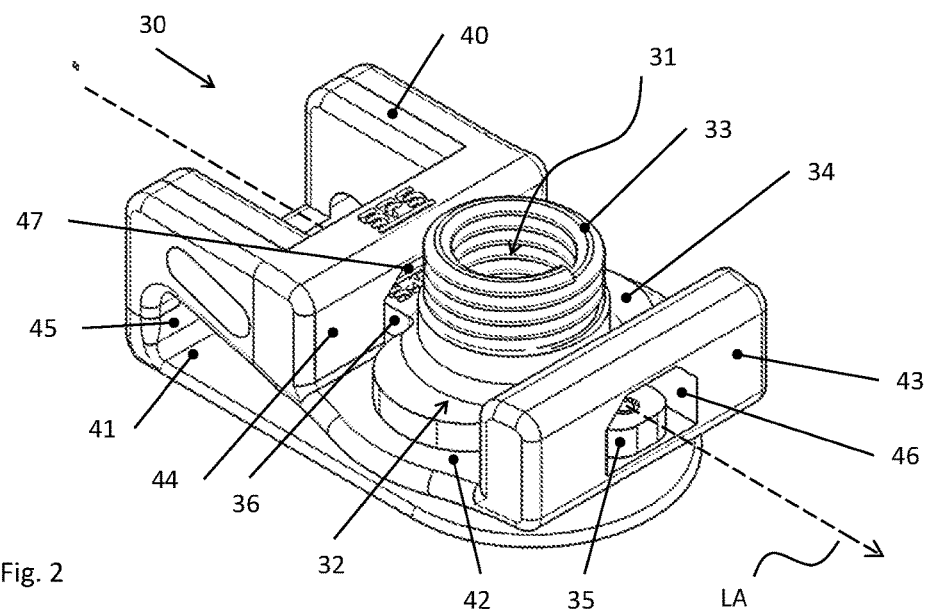
FIG. 2 is a perspective view of a lightweight construction fastener according to an embodiment of the invention.

A lightweight construction fastener 30 according to an embodiment of the invention is depicted by way of example in FIG. 2. Details of the invention are highlighted in FIGS. 3 and 4. In its basic form the lightweight construction fastener or clip 30 comprises a clip body 40 and a fastening element 32. The fastening element 32 in turn comprises a flat base plate 34 with two projections/nibs 35, 36 and a holding part 33 connected with the base plate. The holding part may be implemented as a wire nut 51 or in a conventional manner as an essentially cylindrical component from metal, which preferably is manufactured as an extruded part or turned part from metal sheet or wire.

The clip body in essence comprises a first leg 41 and a second leg 42, which are arranged opposite each other and are connected at one end by a web 45. The two facing sides of the legs 41, 42 will be called inner sides, the sides facing away from each other outer sides. The second leg 42, on its outer side, has two frames 43, 44 with openings 46, 47, which can receive/enclose the projections 35, 36 of the fastening element 32 and which are spaced apart from each other such that the fastening element can be held captive in the clip body with play. The clip body itself is formed of one piece, but comprises at least two volume sections 61, 62, wherein the first section 61 is formed of a first plastic and the second volume section 62 is formed of a second plastic. The properties of the first and the second plastic differ from each other in one or more criteria. The first and second plastics/the first and second volume sections 61, 62 have at least one common contact surface, where the materials are in direct contact.

Differences in the properties may be: the type of plastic (thermosetting plastics, thermoplastics, elastomers); type of quantity/percentage of admixtures (such as glass fibre, carbon fibre); additives of a chemical nature, which impact/determine elasticity, hardness, firmness, temperature resistance, flame-spread performance, porosity. Other feasible indicators are for example substances which could indicate a previous overload, overlay, overheating, cracks or similar. Combinations of the aforesaid materials/property carriers are of course possible.

Preferably the two plastics chosen for the application described are plastic pairs, which differ as regards hardness and elasticity. As such a harder plastic may be chosen for those parts of the clip nut, which must absorb and dissipate forces, whilst more elastic plastics are chosen in cases, where during assembly pliability and adaptability is desired such as in the area of joints or adjustments.

Particular preference is given to plastic pairs, which include a base plastic and comprise different percentages of additives such as fibres. The advantage of this is an improved interlinking of the plastics at the connecting points/contact surfaces of the first plastic with the second plastic, whilst still maintaining the functional difference of the areas.

Figure 3:
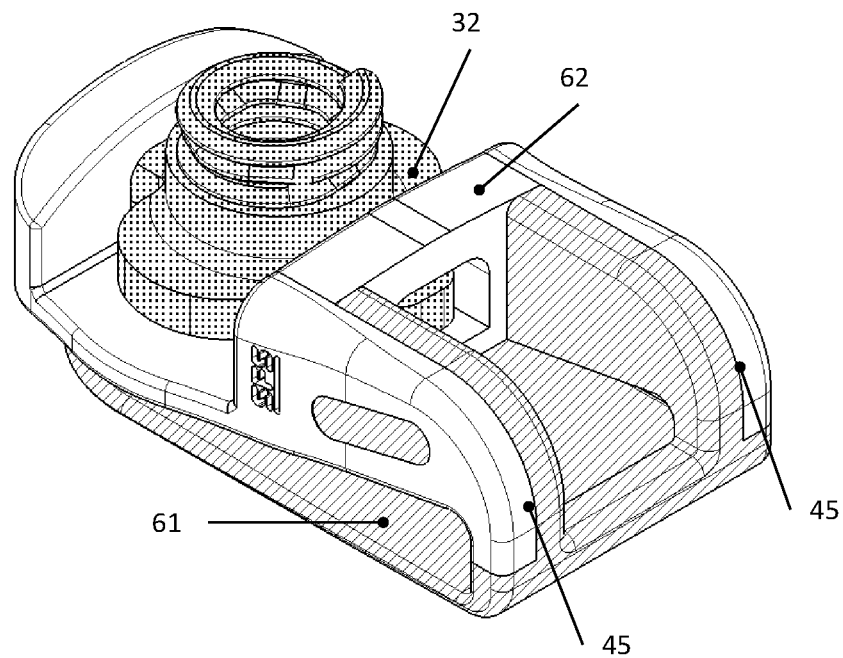
FIG. 3 is a perspective view of a lightweight construction fastener showing the two volume sections formed of different materials.
Figure 4:
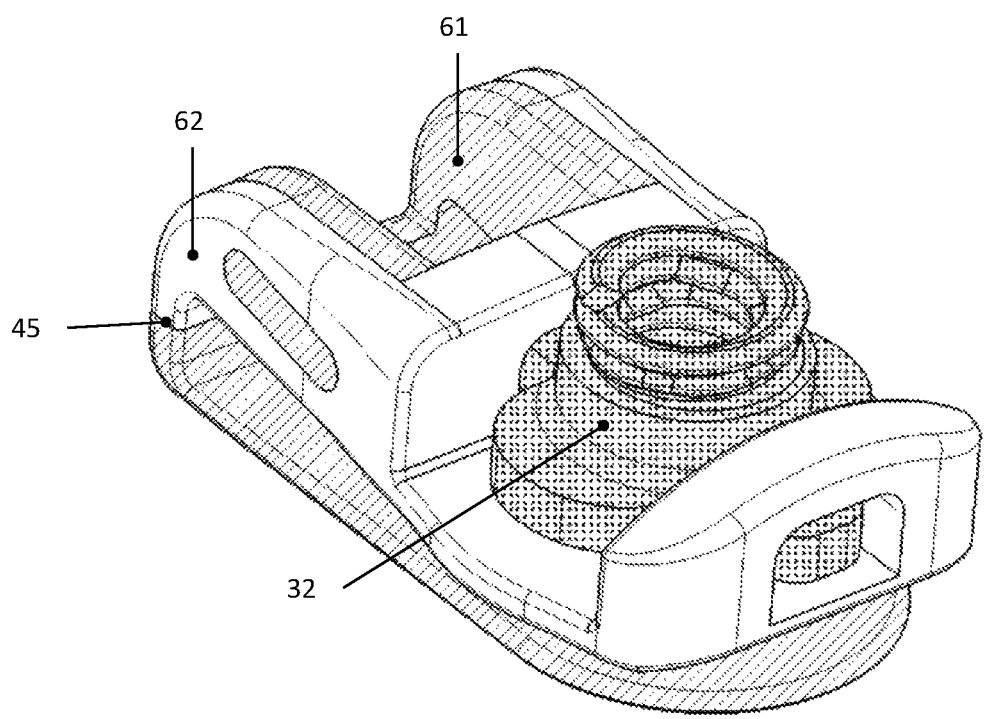
FIG. 4 is an opposite perspective view of the lightweight construction fastener of FIG. 3.

In one embodiment the first volume section 61 comprises the overwhelming part of the first leg 41 and the second volume section 62 comprises the overwhelming part of the second leg 42. The type, design and breakdown of the volume sections and shared contact surface is determined on the one hand by the technical requirements and the other hand by practicability. The depiction in FIGS. 3 and 4 is only to be understood as an example and therefore not limiting.

In the above described embodiment it has become clear that plastics from both the first as well as the second volume section may be present in the area of the web 45, and that therefore contact surfaces exist. This is advantageous because it allows the necessary/desired properties to be accurately determined in the articulated area between the legs 41, 42. As such rigidity for example can be chosen to the extent necessary for the absorption of the torque, and elasticity can be ensured to the extent necessary for the assembly.

In a further embodiment the elastic properties in the first plastic are more pronounced than in the second plastic/the properties as regards hardness are more pronounced in the first plastic than in the second plastic, depending on the respective application profile.

A particularly preferred construction of the lightweight construction fastener or clip is characterised in that the frames 43, 44 are arranged essentially transversely to the longitudinal axis LA of the legs 41, 42, whilst the connecting line of the nibs/projections 35, 36 extends essentially in parallel to the same. The nibs/projections 35, 36 account for a large part of the extension of the fastening element in the plane, therefore the arrangement parallel to the longitudinal axis allows the clip to be given a slimmer shape in comparison to the state of the art.

A method for manufacturing a clip body 40 as a component in a lightweight construction fastener or clip 30 therefore comprises the manufacture as part in a multi-component injection moulding process from at least two plastics. A clip body, in its essential basic form, comprises a first leg 41 and a second leg 42, which are arranged opposite each other and connected at one end with each other by a web 45.

In a further development of the method the clip body would comprise at least two volume sections 61, 62, wherein the first section 61 is manufactured in a first process step from a first plastic and the second volume section 62 is moulded on in a second process step from a second plastic, so that at least one contact surface is created between the two volume sections 61, 62. The properties of the first and second plastics are not the same.

The first described process step takes place in a first cavity, the second process step takes place in a second cavity of an injection moulding machine of a corresponding construction type.

In a particularly preferred further development of the invention the method for producing a lightweight construction fastener or clip 30 comprises: a) placing a fastening element 32 into an injection moulding tool; b) encapsulating the fastening element 32 and c) overmoulding the fastening element 32 according to the above-described method for producing a clip body.

By proceeding in this way it is possible to avoid the working step necessary in the prior art of manually or automatically assembling the fastening element 32 into a separately manufactured clip body 40; the clip leaving the injection moulding machine is ready to use. The step of encapsulating the fastening element is necessary in order to ensure that the fastening element has the necessary mobility in the frame 43, 44, which is conditional on the design of the clip.

FIG. 2 shows the lightweight construction fastener 30 according to an embodiment of the invention. It is comprised essentially of a first leg 41 and a second leg 42, which are connected by a web 45 (constructed here of two parts). The extension of the legs vertically to the web/web area defines the longitudinal extension of the lightweight construction fastener 30 and is indicated as longitudinal axis LA. The basic construction as clamp or clip is supplemented by the elements which receive the fastening element 32 on the top side/the outer side of the leg 42. The latter consists of a base plate 34 with a cylindrical holding part 33 fastened thereto, which comprises a central through-opening 31. In its basic version the base plate has two nibs or projections 35, 36. These engage in two openings 46, 47, which are arranged in frames or cages 43, 44 arranged transversely to the longitudinal axis LA.

FIGS. 3 and 4 show a lightweight construction fastener or clip 30 according to the invention which are, in principle, of identical construction. In accordance with the described structure from (at least) two volume sections 61, 62, the shaded part 61 denotes the first volume section, whilst volume section 62 is shown in white. The fastening element is shown dotted. As described above, the first volume section 61 is formed by a first plastic, and the second volume section 62 is formed by a second plastic. Using the two-stage injection moulding process for this clip body, a partial volume of the clip body is initially produced in a first cavity, whereupon the second part of the volume is added/moulded-on in a further cavity. Interlinking of the plastics will be able to take place at the point, where the first plastic and the second plastic meet, i.e. at the common contact surface(s), provided a corresponding material pair was chosen.

FIGS. 3 and 4 shows 3-D views from different perspectives.

Figures 5, 6:
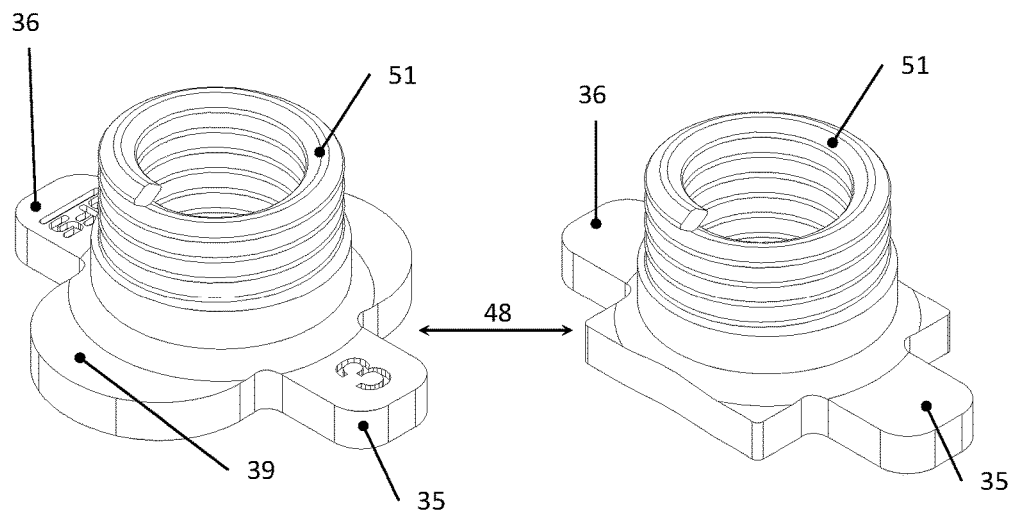
FIG. 5 is a perspective of a fastening element with a first embodiment of a base plate
FIG. 6 is a perspective view of a fastening element with a second embodiment of a base plate

FIGS. 5 and 6 show fastening elements 32 with base plate variants 48 with projections 35, 36. FIG. 6 uses a base plate which is basically angular, whilst FIG. 5 reverts to an oval base plate, preferably the oval with its large semi-axis 39 is arranged transversely to the connecting line of the projections 35, 36.

Both FIGS. 5 and 6 show a so-called wire nut 51 as thread rather than a cylindrical nut part produced by an upsetting or pressing process.

Figure 7:
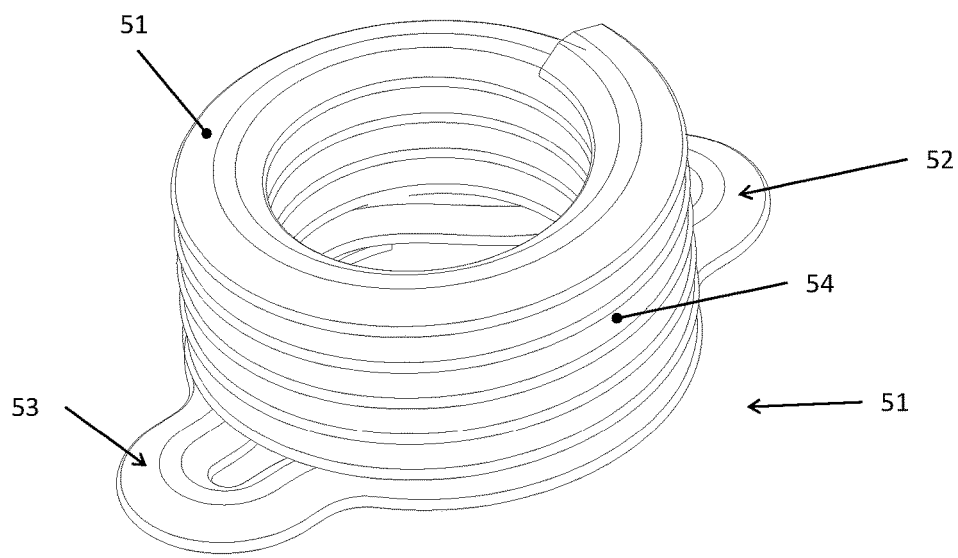
FIG. 7 is a perspective view of another embodiment of a fastening element formed as a wire nut.

FIG. 7 shows a further development of a wire nut 51, which was manufactured complete with thread part 54 and wire loops 52, 53 (functional equivalent to the projections 35, 36) from profile wire. This makes it possible to manufacture the fastening element 32 from one piece. It can be used in a lightweight construction fastener or clip 30 in the same way as in a fastening element 32 according to the state of the art.

LIST OF REFERENCE NUMBERS 10 clip
11 first leg
12 second leg
13 web
14, 15 projections, nibs
16, 17 frame, bracket
18 plate
19, 22 side cheeks
20 fastening element
21 nut part
30 lightweight construction fastener, clip nut, clip
32 fastening element
33 holding element, holding part
34 base plate
35, 36 projection, nib
39 large semi-axis of an oval base plate
40 clip body
41 first leg
42 second leg
43, 44 frame, cage
45 web
46, 47 breakthrough
48 basically angularly shaped base plate
51 wire nut
52, 53 wire loop(s)
54 thread part
61 first volume section
62 second volume section

The invention claimed is:

1. A lightweight construction fastener or clip, comprising a one-piece clip body formed of plastic, with a first leg and a second leg, which are arranged opposite each other and connected to each other by a web at one end;
a fastening element with a flat base plate with two projections or nibs and a holding part connected with the base plate,
the second leg, on an outer side thereof, comprises two frames with openings, which receive the fastening element and which are spaced apart from each other such that the fastening element is held captive in the clip body with play,
the clip body comprises at least first and second volume sections, the first volume section is formed of a first plastic and the second volume section is formed of a second plastic, such that at least one common contact surface exists between the two volume sections,
the properties of the first and the second plastics differ from each other by at least one of: a type of the plastic; a type and quantity/percentage of admixtures; or chemical additives, which determines elasticity; and
the first volume section forms a majority of the first leg, the second volume section forms a majority of the second leg and the web is comprised of the first and second volume sections.

2. The lightweight construction fastener or clip according to claim 1, wherein the frames are arranged essentially transversely to the longitudinal axis of the legs, and the connecting line of the projections or nibs is arranged essentially in parallel thereto.

3. The lightweight construction fastener or clip according to claim 1, wherein the first plastic is more elastic than the second plastic.

4. The lightweight construction fastener or clip according to claim 1, wherein the first plastic has harder properties than the second plastic.

5. The lightweight construction fastener or clip according to claim 1, wherein the first leg is formed entirely of the first plastic.

6. The lightweight construction fastener or clip according to claim 1, wherein the first volume section extends into the second leg.

7. The lightweight construction fastener or clip according to claim 1, wherein the first volume section forms the entire first leg.

8. A method for producing a clip body from plastic, wherein the clip body comprises a first leg and a second leg, which are arranged opposite each other and connected with each other by a web at one end, the method comprising:
producing the clip body in one piece in a multi-component injection moulding process from at least two plastics, wherein the clip body comprises at least first and second volume sections;

producing the first section in a first process step from a first plastic, and producing the second volume section in a second process step from a second plastic, and creating at least a common contact surface between the two volume sections, wherein the properties of the first and second plastic are different from each other by at least one of: a type of the plastic; a type and quantity/percentage of admixtures; or chemical additives, which determines elasticity; and the first volume section forming a majority of the first leg, the second volume section forming a majority of the second leg and the web is comprised of the first and second volume sections.

9. The method for producing a clip body according to claim 8, wherein the first process step takes places in a first cavity, and the second process step in a second cavity.

10. A method for producing a clip body according to claim 1, comprising:
   a) placing the fastening element into an injection moulding tool,
   b) encapsulating the fastening element, and
   c) overmoulding the fastening element with the clip body that is formed in one piece in a multi-component injection moulding process from at least two plastics.

* * * * *